United States Patent
Flurry et al.

(10) Patent No.: US 7,464,142 B2
(45) Date of Patent: Dec. 9, 2008

(54) PORT TYPE AGNOSTIC PROXY SUPPORT FOR WEB SERVICES INTERMEDIATES

(75) Inventors: Gregory Alan Flurry, Austin, TX (US); Simon Antony James Holdsworth, Andover (GB); James Michael Snell, Hanford, CA (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 10/734,773

(22) Filed: Dec. 12, 2003

(65) Prior Publication Data

US 2005/0132086 A1  Jun. 16, 2005

(51) Int. Cl.
*G06F 13/00* (2006.01)

(52) U.S. Cl. ............... 709/217; 709/213; 709/226; 709/218; 709/219

(58) Field of Classification Search ......... 709/217–219, 709/203, 223–227; 719/328, 311
See application file for complete search history.

(56) References Cited

U.S. PATENT DOCUMENTS

| 6,360,262 | B1 | 3/2002 | Guenthner et al. | 709/226 |
| 7,139,811 | B2 * | 11/2006 | Lev Ran et al. | 709/217 |
| 2002/0178214 | A1 * | 11/2002 | Brittenham et al. | 709/203 |
| 2003/0061404 | A1 | 3/2003 | Atwal et al. | |
| 2003/0135628 | A1 | 7/2003 | Fletcher et al. | |
| 2003/0204645 | A1 * | 10/2003 | Sharma et al. | 709/328 |
| 2004/0172555 | A1 * | 9/2004 | Beringer et al. | 713/201 |
| 2004/0205765 | A1 * | 10/2004 | Beringer et al. | 719/311 |

OTHER PUBLICATIONS

Venkatapathy et al; An Introduction to Web Services Gateway; Internet Citation; May 1, 2002; XP002288276; US.
PCT International Search Report and Written Opinion of the International Searching Authority; App No. PCT/EP2004/053382; Filing Date: Sep. 12, 2004; EP.

* cited by examiner

*Primary Examiner*—Jeffrey Pwu
*Assistant Examiner*—Sulaiman Nooristany
(74) *Attorney, Agent, or Firm*—H. Artoush Ohanian; Herman Rodriguez; Biggers & Ohanian, LLP

(57) ABSTRACT

Methods, systems, and products are disclosed in which port type agnostic proxy support for web services intermediaries is typically provided by receiving in a web services intermediary a request for execution of a web services operation, wherein the request includes parametric information from which an endpoint for a target service that supports the operation can be identified; identifying, in dependence upon the parametric data, the endpoint for a target service that supports the operation; creating a target service request for execution of the operation on the target service; and issuing the target service request to the target service. Exemplary embodiments typically also include the return path of request-response processing; receiving in the intermediary a response from the target service; creating in the intermediary, in dependence upon the response from the target service, a response from the intermediary; and returning the response from the intermediary to the requesting client.

9 Claims, 4 Drawing Sheets

PORT TYPE AGNOSTIC PROXY SUPPORT FOR WEB SERVICES INTERMEDIATES

BACKGROUND OF THE INVENTION

1. Field of the Invention

The field of the invention is data processing, or, more specifically, methods, systems, and products for port type agnostic proxy support for web services intermediaries.

2. Description of Related Art

The term "web services" refers to a standardized way of integrating web-based applications. Web services typically provide business services upon request though data communications in standardized formats called bindings. A binding is a specification of a data encoding method and a data communications protocol. The most common binding in use for web services is data encoding in XML according to the SOAP protocol and data communications with HTTP.

Unlike traditional client/server models, such as an HTTP server that provides HTML documents in response to requests from browser clients, web services are not concerned with display. Web services instead share business logic, data, and processes through a programmatic interface across a network. Web services applications interface with one another, not with users. Because all data communications among web services are carried out according to standardized bindings, Web services are not tied to anyone operating system or programming language. A Java client running in a Windows™ platform can call web service operations written in Perl and running under Unix. A Windows application written in C++ can call operations in a web service implemented as a Java servlet.

Today web services are growing across many industries. As web services grow in importance, web services intermediaries are increasingly recognized as means to provide many value-added services. A web services intermediary, generally referred to in this specification as an "intermediary," is a web services component that lies between a web services client and a web services provider. Intermediaries operate generally by intercepting a request from a client, providing intermediary services, and then forwarding the client request to a web services provider. Similarly, responses from the web services provider are intercepted, operated upon, and then returned to the client. Examples of commercially available products with which web services intermediaries may be implemented include IBM's Web Services Gateway™ and IBM's Web Services Bus™.

Services provided by intermediaries include authentication of sources of requests for target services, message validation for content and for form, and message logging for auditing purposes. Intermediaries may provide management reporting services, number of web service hits, quantity and timing of services used by individual clients, and so on. Intermediaries can be used as caches in support of improved performance by storing frequently changing but frequently requested data such as news stories, for example. Intermediaries can be used for performance improvement in the sense of load balancing, storing requests for services from several clients and forwarding them to a target service during off-peak service hours. Intermediaries may aggregate services, as, for example, an accounting intermediary that accepts requests for account postings that are then forwarded to separate target services for accounts payable, accounts receivable, and general ledger services.

It is common in prior art to implement web services intermediaries so that they are tightly coupled to their target services. That is, a particular intermediary provides intermediary services only to particular target web services. The need for this is clear when, for example, the intermediary provides message validation and must therefore have precise knowledge of proper message content and form. In the terminology of web services, a group of operations is referred to as a "port type." In this terminology, the restriction of tight coupling means that commonly in prior art, an intermediary service and all target services served by the intermediary service would have the same port type. There are situations, however, where it is useful for an intermediary service to function across port types, such as, for example, a client identity authentication function intended to provide exactly the same authentication function on messages directed to any target service, regardless of port type. Prior art forces additional configuration complexity in such cases, and there is an ongoing need for improvement in web services intermediaries.

SUMMARY OF THE INVENTION

Port type agnostic proxy support for web services intermediaries including receiving in a web services intermediary a request for execution of a web services operation, wherein: the web services intermediary includes a proxy, wherein no configuration data available to the proxy describes an endpoint of the target service and the requester submits requests for operations in port types completely unknown to the intermediary; and the request includes parametric information from which an endpoint for a target service that supports the operation is identified; identifying, by the web services intermediary in dependence upon the parametric data, the endpoint for a target service that supports the operation; creating, by the web services intermediary, a target service request for execution of the operation on the target service, further comprising: composing the request in a data structure useful in a binding-neutral interface; and calling the binding-neutral interface, passing the request as a call parameter; and issuing, by the web services intermediary, the target service request to the target service.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1A:
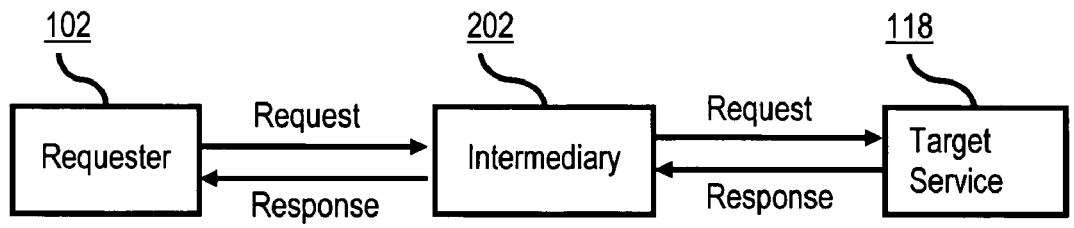
FIGS. 1A and 1B set forth line drawings of exemplary architectures for web services in which port type agnostic proxy support for web services intermediaries may be implemented according to embodiments of the present invention.

The present invention is described to a large extent in this specification in terms of methods for port type agnostic proxy support for web services intermediaries. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

A "business registry," as the term is used in this specification, is an Internet directory of web services containing listings of businesses and the web services offered by the businesses. The listings of the web services include supported operations, port types, endpoints, bindings, and so on. Some business registries are based on open standards such as ebXML, and some are based on industry consortium-led specifications such as UDDI. Businesses can register themselves with a registry. Businesses can submit material to be shared through a registry, and registry clients can search for material that others have submitted. Business registries may be accessed and searched manually through browsers or programmatically through APIs which themselves may be web services. Registries are becoming an increasingly important component of Web services because they allow businesses to collaborate with one another dynamically in a loosely coupled way.

HTTP means "HyperText Transfer Protocol, the most common data communications protocol on the web. In this specification, the term "web," however, is not limited to HTTP communications, but also may include communications with other protocols that support similar modes of communication such as HDTP, the Handheld Device Transfer Protocol, or WAP, the Wireless Access Protocol, and others as will occur to those of skill in the art.

"SOAP" means "Simple Object Access Protocol," a lightweight XML-based messaging protocol used to encode the information in Web service request and response messages before sending them over a network. SOAP messages are independent of any operating system or protocol and may be transported using a variety of Internet protocols, including SMTP, MIME, and HTTP.

"UDDI" means "Universal Description, Discovery and Integration," a web-based distributed directory that enables businesses to list themselves on the Internet and discover each other, similar to a traditional phone book's yellow and white pages.

"WSDL" means "Web Services Description Language." WSDL is an XML-formatted language that was developed jointly by Microsoft and IBM and is used to describe a Web service's capabilities as collections of communication endpoints capable of exchanging messages. WSDL is an integral part of UDDI in that UDDI uses WSDL to describe web services' capabilities.

"ebXML" means "electronic business Extensible Markup Language," a modular suite of specifications for standardizing descriptions of web services in XML to facilitate trade electronic commerce. Like UDDI, the ebXML specification gives businesses a standard method to define and register web services.

This specification generally describes components of web services with a terminology similar to that of WSDL. Web services are described as collections of network endpoints, endpoints of data communications, capable of exchanging messages. Endpoints are sometimes referred to as "ports." In this specification generally, however, the term "endpoint" is preferred to "port," to reduce the risk of confusion with the term "port type." A port type is not a type of port or a type of endpoint. A port type is a collection of "operations," that is, software actions or functions, supported by a service.

A particular communications protocol and a data format specification for a port type constitute a "binding." An example of a binding is SOAP/HTTP, with message data encoded according to SOAP and messages communicated among endpoints according to HTTP. Another example of a binding is GET/POST/HTTP, with message data encoded in GET or POST messages and data communications carried out according to HTTP.

Each port type may have more than one binding. An endpoint is defined by associating a network address with a binding, and, as mentioned, a collection of endpoints define a service. Communication of data and requests for operations in web services is carried out through data structures called "messages," which in turn are composed of "parts." The terms "request" and "response" are generally indications of the direction of message flow. Request messages and response messages for a particular binding may have the same structure.

Port Type Agnostic Proxy Support For Web Services Intermediaries

Figure 1B:
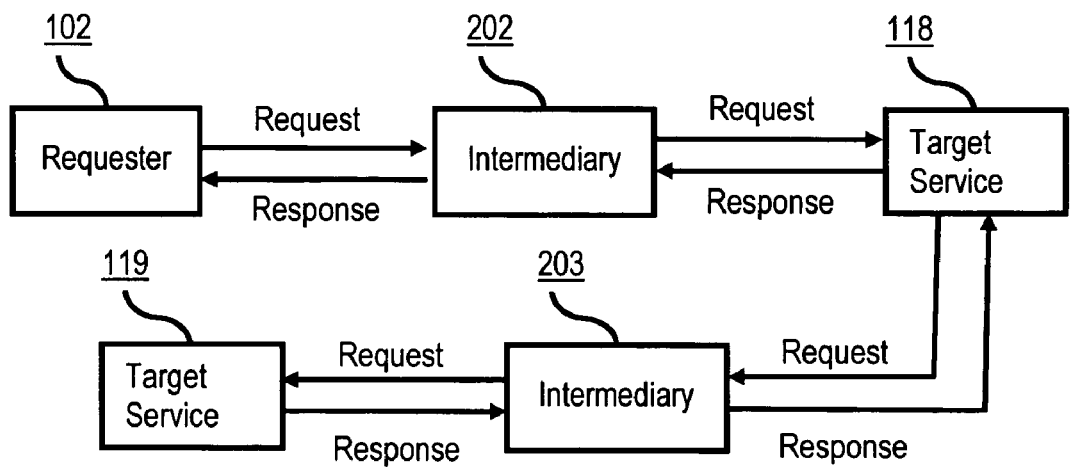

With reference to the accompanying drawings, methods, systems, and products are described for port type agnostic proxy support for web services intermediaries, beginning with FIGS. 1A and 1B. FIG. 1A sets forth a line drawing of an exemplary architecture for web services in which port type agnostic proxy support for web services intermediaries may be implemented according to embodiments of the present invention. In the architecture of FIG. 1A, intermediary (202) is capable of connecting for data communications through a protocol to requester (102) and target service (118). A web services component in the position of requester (102) is sometimes referred to as a client. Similarly, a component in the position of intermediary (202), particular when viewed from the point of view of a requester, is sometimes referred to as a server.

The client/server distinction must be used carefully in the context of web services. In the architecture of FIG. 1B, for example, target service (118), in the process of preparing a response to a request from requester (102), may in turn request web services from target service (119) through intermediary (203). In doing so, target service (118) is acting as a client. Intermediary (202) in forwarding requests to target service (118) is acting as a client. Whether a particular component is considered a client or a server at any particular time depends upon the particular function being performed by the component at the time. That is, a web services component can be a client one moment and a server the next. To reduce the risk of confusion from terminology, therefore, web services components are usually described in this specification by using the terms "requester," "intermediary," and "target service" rather than "client" or "server."

In order for intermediary (202) to provide intermediary services on behalf of target service (118), intermediary (202) must know an endpoint on target service (118). As mentioned above, in prior art, a service, called a "proxy," running on intermediary (202) would support the same port type as the target service (118) and would have in its configuration data an endpoint for target service (118). In the architecture of FIG. 1, however, the proxy is 'port type agnostic,' meaning that no configuration data available to the proxy describes an endpoint of the target service and that requester (102) may submit requests for operations in port types completely unknown to the intermediary.

Figure 2A:
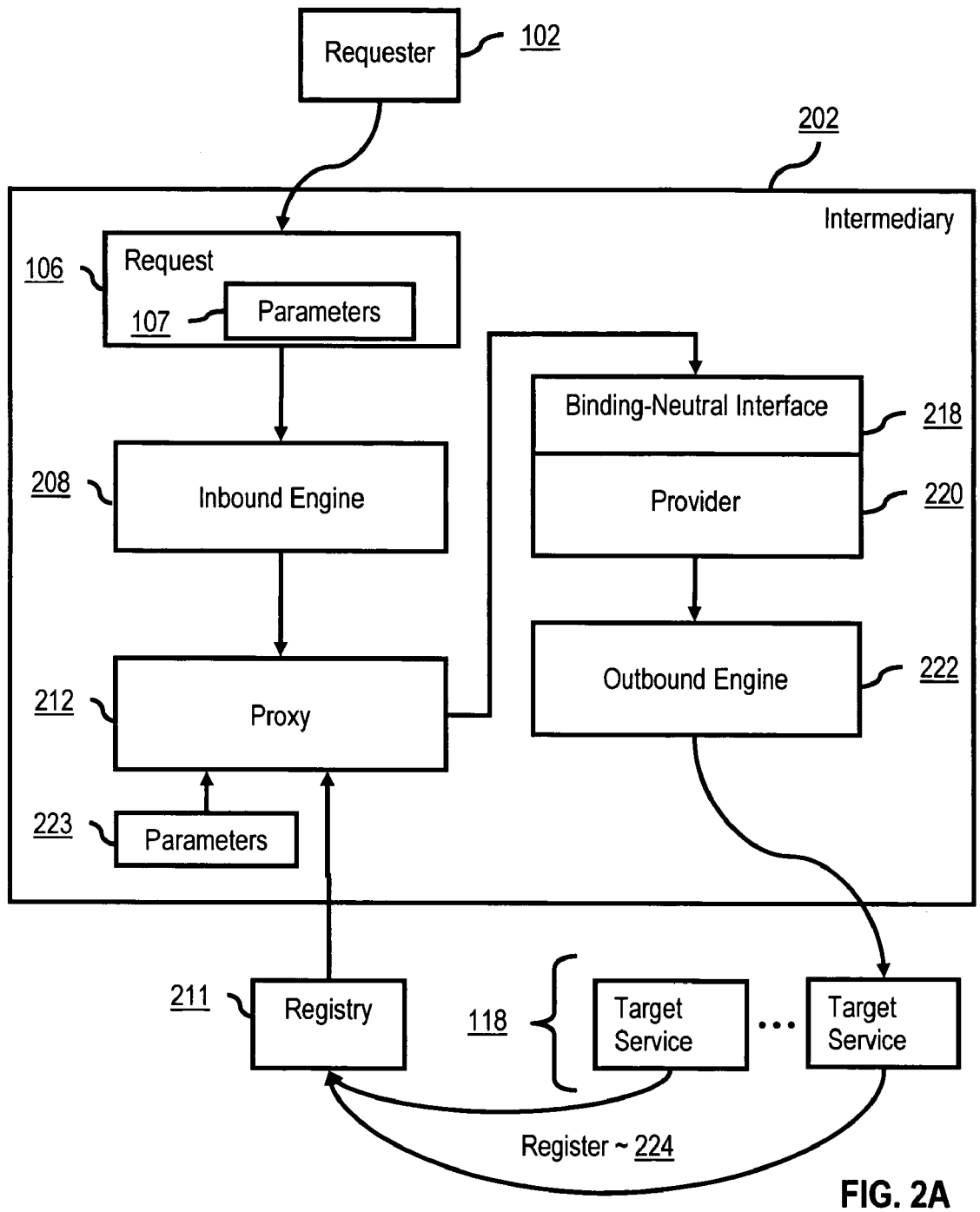
FIG. 2A sets forth a line drawing of a block diagram of an exemplary intermediary according to embodiments of the present invention.

FIG. 2A sets forth a line drawing of a block diagram of an exemplary intermediary (202) according to embodiments of the present invention. Intermediary (202) comprises automated computing machinery, a computer system, including at least one central processing unit, computer memory, a system bus, and so on. The blocks in the block diagram of FIG. 2A represent software application modules operable in a computer system of intermediary (202). The arrows in FIG. 2A represent data flow among software modules.

Intermediary (202) includes an inbound engine (208) capable of receiving from a requester (102) a request (106), including parametric information (107), for execution of a web services operation. Here is an example of such a request for the SOAP-HTTP binding:

```
POST /Channel/proxy?portType=A HTTP/1.1
Host: www.myIntermediary.com
Content-Type: text/xml; charset="utf-8"
Content-Length: nnnn
SOAPAction: "Some-URI"
<SOAP-ENV:Envelope
    xmlns:SOAP-ENV="http://schemas.xmlsoap.org/soap/envelope/"
    SOAP-ENV:encodingStyle="http://schemas.xmlsoap.org/soap/encoding/">
        <SOAP-ENV:Body>
            <m:myOp xmlns:m="Some-URI">
            </m:myOp>
        </SOAP-ENV:Body>
</SOAP-ENV:Envelope>
```

This exemplary POST message includes a SOAP envelope requesting the 'myOp' operation from the intermediary. That is, the name of the operation to be executed on a target service (118) is identified internally within the soap message. The myOp operation, its port type, and it endpoint are all unknown to the intermediary before the request is received. In this example, the parametric information (107) from which an endpoint for a target service (118) that supports the operation can be identified is set forth in a name-value pair in the URI-encoded query string in the first line of the POST: "portType=A."

In addition to receiving from a requester (102) a request (106), including parametric information (107), for web services, inbound engine (208) also has a capability of providing the request, including its parametric data, to port type agnostic proxy (212). Consider as an example of inbound engine operation, the exemplary request set forth just above. That exemplary request is bound as SOAP-HTTP. For this exemplary request, therefore, inbound engine may be a SOAP-enabled HTTP server that hands off an incoming request to a proxy (212) implemented as any kind of server-type application, including for example, a Java Bean, a Java servlet or a CGI (Common Gateway Interface) script written in Perl. Java servlets and CGI scripts are mentioned only for explanation, not for limitation. Within the scope of the present invention, any kind of server-side functionality as will occur to those of skill in the art may be used to implement port type agnostic proxy functions for web services intermediaries.

Port type agnostic proxy (212) may be hard coded to operate exclusively as a port type agnostic proxy, or, alternatively, port type agnostic proxy (212) may operate modally in dependence upon configuration parameters (223). A configuration parameter may be provided to indicate whether port type agnostic proxy (212) is to operate as a traditional intermediary service or in port type agnostic mode. Such a configuration parameter advantageously promotes efficient program coding including particularly reuse of code segments that might be utilized in both modes. Another configuration parameter supporting efficient use of program code is a parameter identifying a binding or 'channel type' for a proxy. As explained in more detail below, port type agnostic proxies may operate with any binding supported by web services, SOAP, MIME, GET/POST/HTTP, and so on. Port type agnostic proxy may be coded to operate with any binding or channel type and then configured with a parameter advising the proxy of its binding or channel type for run time operations. In addition, a configuration parameter may be provided to turn on or off any intermediary services in the proxy that would require parsing the contents of a request or response message. Such a parameter advantageously may be used to optimize performance because parsing message contents has a tendency to slow intermediary performance. Many port type agnostic proxies as well as other intermediary services may operate simultaneously in intermediary (202), and names for each may be assigned as configuration parameters. Messages handlers and filters may be assigned to proxies in configuration parameters. This paragraph describes several configuration parameters for port type agnostic proxies by way of explanation, not limitation. The use of any configuration parameters as will occur to those of skill in the art is well within the scope of the present invention.

Figure 2B:
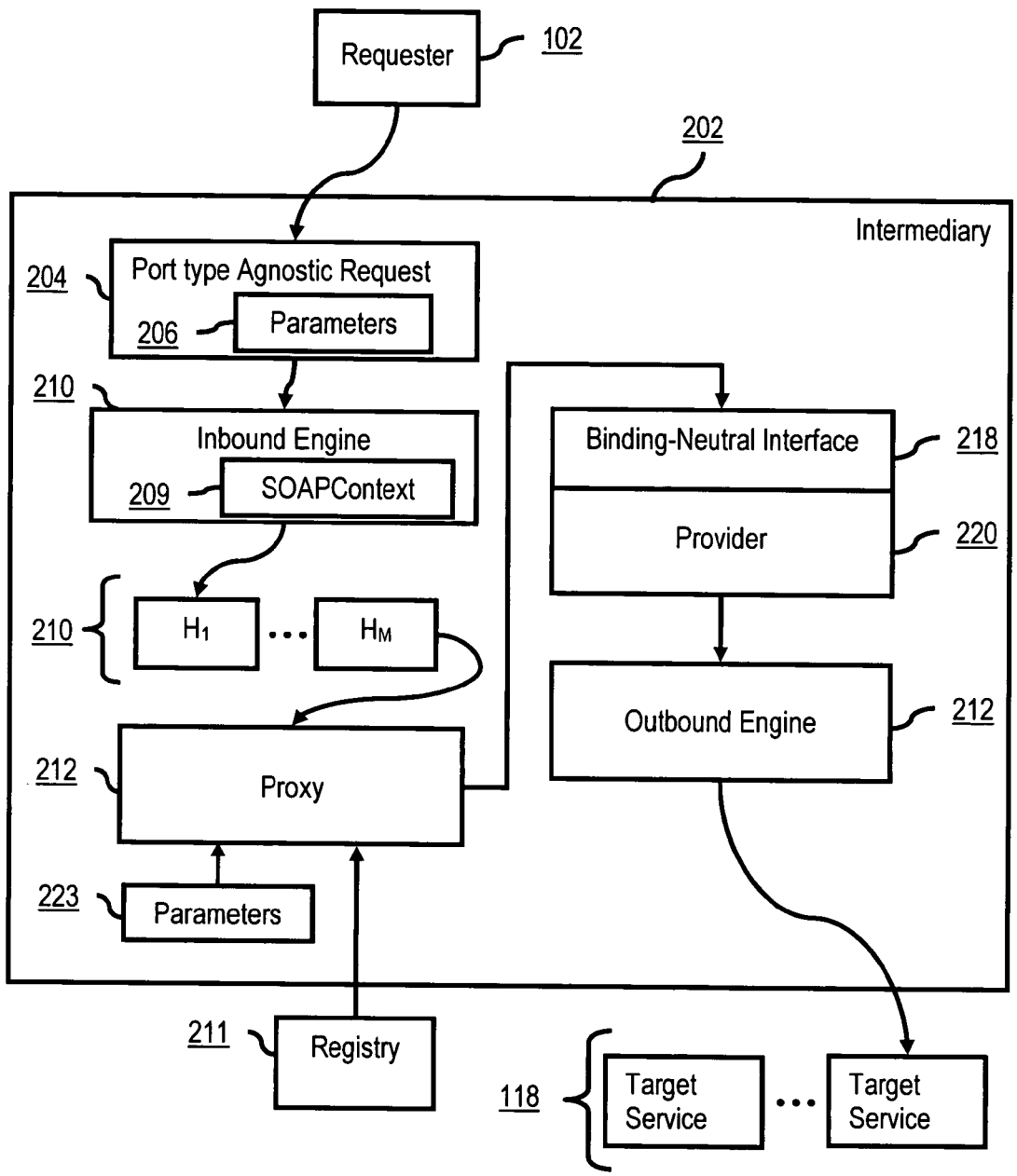
FIG. 2B sets forth a line drawing of a block diagram of an exemplary intermediary (202) implementing a SOAP-HTTP channel according to embodiments of the present invention.

FIG. 2B sets forth a line drawing of a block diagram of an exemplary intermediary (202) implementing a SOAP-HTTP channel according to embodiments of the present invention.

As mentioned, an inbound engine (208) capable of providing the request, including its parametric data, to port type agnostic proxy (212) for a request with a SOAP binding may be implemented as a SOAP-enabled HTTP server. Such an inbound engine may be configured with a number of references to SOAPHandler objects (210) for the proxy, where each SOAPHandler object (210) is configured to provide some data processing task on the request for the proxy. Such an inbound engine typically operates by encapsulating the incoming request along with its parametric information in a SOAPContext object (209), passing a reference to the SOAPContext object in turn to each SOAPHandler (210) configured for the proxy, and then passing the SOAPContext (209) in its entirety to the proxy (212). In a general sense, it is a port type agnostic proxy that identifies the endpoint, but a detailed implementation level may include proxy functionality in handlers, as is the case for SOAP. That is, the incoming engine may establish a property in a SOAPContext that may be set to an endpoint of a target service, a URL in the case of SOAP/HTTP. In such an embodiment, one of the SOAPHander objects (210) usefully may be programmed to extract the parametric information from the request and place it in name-value pairs in the SOAPContext so that the proxy can use it to identify an endpoint for a target service (118) that supports a requested web services operation.

Alternatively, an incoming request may be bound with GET/HTTP rather than SOAP. In such an example, proxy (212 on FIG. 2A) may be implemented as a Java servlet. Inbound engine (208) may be implemented as a Java-enabled HTTP server that encapsulates the request, including its parametric information, in an HTTPServletRequest object and provides to the proxy a reference to that HTTPServletRequest object. The proxy can then obtain the parametric information through a call to HTTPServletRequest.getQueryString( ), which returns the query string from the request URL, that is, everything in the request URL after the question mark. Having the entire query string, such an exemplary proxy is programmed to extract the parametric data from the query string, that is, in this example, "portType=A," and use the information so extracted to identify an endpoint for a target service (118) that supports a requested web services operation. One way that the proxy may identify an endpoint for a target service that supports a requested web services operation is to retrieve an endpoint description from a business registry (211) such as a UDDI registry or a ebXML registry. Target services (118) typically make such descriptions, including, for example, descriptions expressed as WSDL documents, by registering (224) them in a business registry (211).

In SOAP based web services, the SOAP message itself contains the name of the operation and the parameters for the operation; they are not in the endpoint URL. It is useful for the intermediary to receive parametric information such as the portType parameter. That parameter may be something as simply as the name of the portType. If such a case, then some 'business logic' that runs in the server (in a handler, for example, or even in the proxy function itself) must choose the actual endpoint URL for the target service (118) based on the port type or other parametric information. The parametric information may even include an actual endpoint URL. In that case, the 'business logic' could ultimately send the request to that URL. Both port type and endpoint URL could be present in the parametric information, and the 'business logic' may then attempt to determine an endpoint URL and use the one in the request as a default if nothing better is found. The invention allows all three scenarios as well as any variants that can be controlled by the business logic. Always there may be other parameters that help control the 'business logic.'

Although this specification tends to discuss exemplary bindings in terms of the SOAP/HTTP binding and sometimes in terms of the GET/POST/HTTP binding, the discussion of these exemplary bindings is for convenience of explanation and not as a limitation of the invention. Alternative exemplary bindings useful according to various embodiments of the invention include MIME/SMTP (Multipart Internet Mail Extensions over the Small Message Transport Protocol) and RMI/IIOP (Java's Remote Method Invocation over the Common Object Request Broker Architecture's Internet Inter-ORB Protocol). In fact, within the scope of the present invention, an arbitrary Java class may be treated as a Web service, with native Java invocations as the access protocol, and the use in port type agnostic proxies of any other binding as will occur to those of skill in the art is well within the scope of the present invention.

In the exemplary intermediary (202) of FIG. 2A, proxy (212) is a port type agnostic proxy that performs whatever intermediary services it is designed for, requester authentication, message validation, message logging, management reporting services, and so on, identifies an endpoint of a target service (118) that supports a requested operation, and then transmits the request to the target service through binding-neutral interface (218). As explained in more detail below, binding-neutral interface (218) is an interface whose form of usage does not depend upon request binding.

In the exemplary intermediary (202) of FIG. 2A, binding-neutral interface (218) operates a provider (220) which in turn calls an outbound engine (222) to forward the request (106) to a target service (118). It is possible for the interface (218) to operate in a binding-neutral fashion because it is backed up by code in the provider (220) that is protocol-specific. The provider (220) carries out the actual message exchanges according to the specifics of a particular protocol, SOAP, HTTP, and so on. Decoupling the binding-neutral interface from the provider that carries out the actual data communications supports dynamic registration of new providers, so that an intermediary may enhance its data communications ability with no need to recompile or redeploy. A provider may be implemented as an object, often provided by a target service supported by the provider's protocols, with a reference to the provider dynamically installed in a binding-neutral interface. The outbound engine (222) is the actual data communications engine for the protocol implemented by the provider (222). When the protocol is taken as SOAP/HTTP, for example, the outbound engine is a SOAP/HTTP engine capable of sending and receiving SOAP/HTTP request and response message to and from target web services. When the protocol is HTTP, for example, the outbound engine is an HTTP data communications client module, similar to the data communications module of a web browser.

Figure 3:
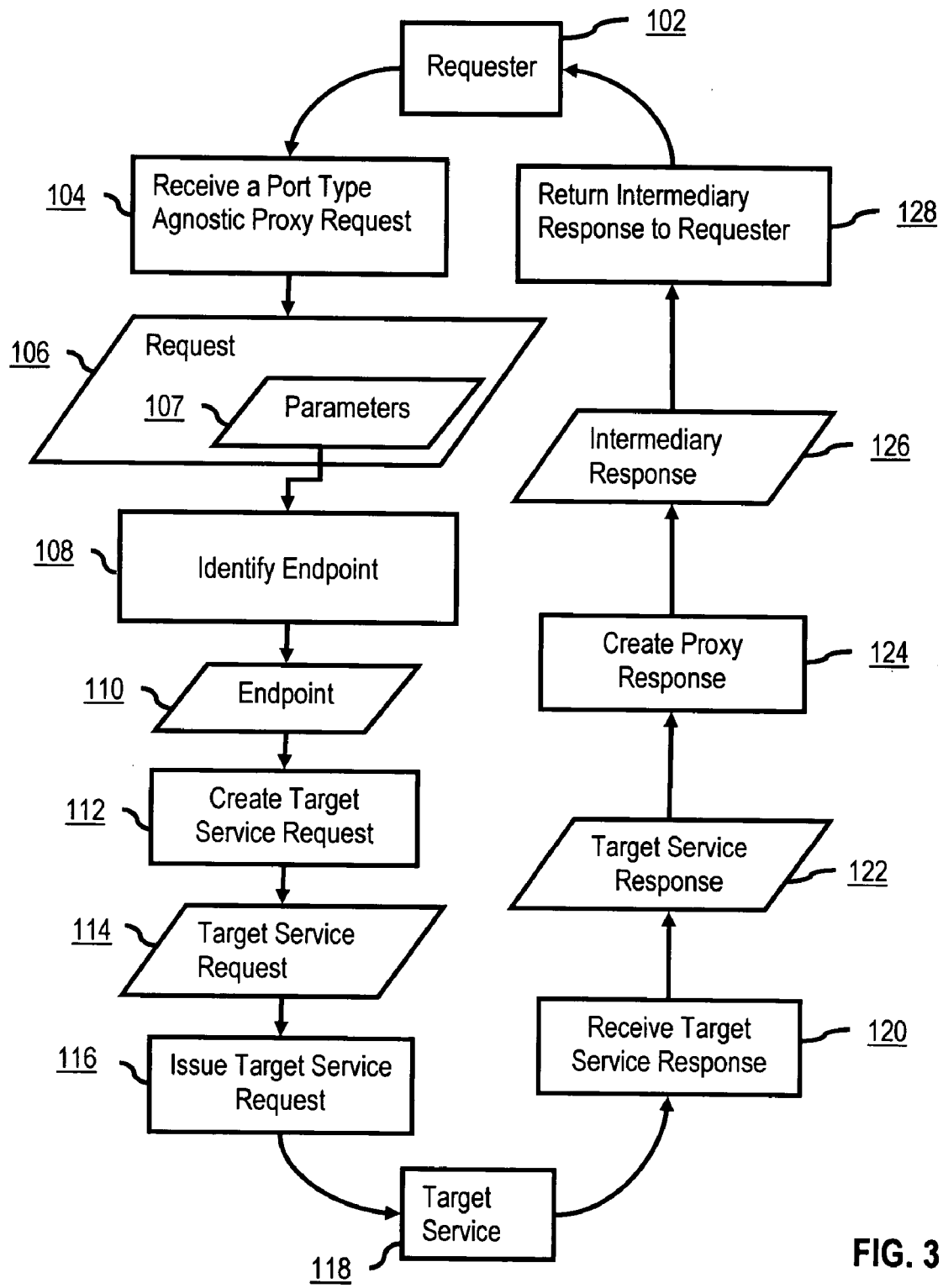
FIG. 3 sets forth a flow chart illustrating a method of port type agnostic proxy support for web services intermediaries.

In order to provide its intermediary services, the intermediary advantageously is capable of identifying an endpoint for a request. A method for doing so is discussed with reference to FIG. 3. FIG. 3 sets forth a flow chart illustrating a method of port type agnostic proxy support for web services intermediaries that includes receiving (104) in a web services intermediary a request (106) for execution of a web services operation, wherein the request includes parametric information (107) from which an endpoint for a target service that supports the operation can be identified.

Here again is an example of such a request for the SOAP-HTTP binding:

```
POST /Channel/proxy?portType=A HTTP/1.1
Host: www.myIntermediary.com
Content-Type: text/xml; charset="utf-8"
Content-Length: nnnn
SOAPAction: "Some-URI"
<SOAP-ENV:Envelope
    xmlns:SOAP-ENV="http://schemas.xmlsoap.org/soap/envelope/"
    SOAP-ENV:encodingStyle="http://schemas.xmlsoap.org/soap/encoding/">
        <SOAP-ENV:Body>
            <m:myOp xmlns:m="Some-URI">
            </m:myOp>
        </SOAP-ENV:Body>
</SOAP-ENV:Envelope>
```

This exemplary POST message includes a SOAP envelope requesting the 'myOp' operation from the intermediary. The myOp operation, its port type, and its endpoint are all unknown to the intermediary before the request is received. In this example, the message is taken as the SOAP envelope, and the parametric information (107) from which an endpoint for a target service that supports the operation can be identified is the HTTP parameter "portType=A." In this example, because the name of the operation on the target service is already encoded in the SOAP envelope, the only parametric data to be added is the port type "A," a port type that includes the operation on the target service.

The method of FIG. 3 also includes identifying (108), in dependence upon the parametric data, the endpoint (110) of a target service that supports the operation. In this SOAP-HTTP example, identifying (108) the endpoint (110) of a target service that supports the operation is carried out by retrieving an endpoint description from a business registry such as a UDDI registry or a ebXML registry. In this example, the intermediary retrieves from a registry an endpoint of port type A described as bound by SOAP-HTTP at network address http://www.myTarget.com/SOAP-HTTP/servlets/.

The illustrated method includes creating (112) a target service request (114) for execution of the operation on the target service. In this example, the intermediary is programmed to create a target service request as an HTTP POST message using the endpoint on the target service. The parametric data for identifying an endpoint is deleted, and the request is directed to a script for handing SOAP messages that will itself identify the operation from the operation name in the SOAP envelope. The resulting target service request is the following:

The method of FIG. 3 also includes issuing (116) the target service request (114) to the target service (118). In this example, issuing the target service request includes opening a TCP/IP connection to the target service endpoint at http://www.myTarget.com/ and sending the HTTP POST message through the TCP/IP connection to the target service.

It is useful to note, that in at least some embodiments of the present invention, in methods of port type agnostic proxy support such as the one illustrated in FIG. 3, the target service request as created and issued to the target service bears unexamined and unmodified message contents of the request received in the web services intermediary. In the example under discussion just above, the proxy service on the intermediary identified an endpoint of a target service from the parametric data "portType=A" and redirected the message to the endpoint so identified, all without touching, opening, examining, parsing, or in other any way disturbing the message body, the SOAP envelope, which remained unexamined and unchanged throughout the entire process of delivery from its requester to its target service. In the process, the proxy service provided one or more of the intermediary services, authentication, management reporting, load balancing, service aggregation, and so on.

By way of further explanation, an exemplary request is presented for the GET/HTTP binding, directed to an endpoint at http://www.myIntermediary/channelApps/GET-HTTP/servlets/proxy. The exemplary incoming request message has this form:

```
GET /servlets/proxy?message=messageContentString&
operation=myOp&portType=A HTTP/1.1
```

```
POST /SOAP-HTTP/servlets/QuoteServiceServlet HTTP/1.1
Host: www.myTarget.com
Content-Type: text/xml; charset="utf-8"
Content-Length: nnnn
SOAPAction: "Some-URI"
<SOAP-ENV:Envelope
    xmlns:SOAP-ENV="http://schemas.xmlsoap.org/soap/envelope/"
    SOAP-ENV:encodingStyle="http://schemas.xmlsoap.org/soap/encoding/">
        <SOAP-ENV:Body>
            <m:myOp xmlns:m="Some-URI">
            </m:myOp>
        </SOAP-ENV:Body>
</SOAP-ENV:Envelope>
```

And in URI space, the exemplary request may be shown as:

```
http://www.myIntermediary.com/servlets/
proxy?message=messageContentString&operation=myOp&portType=A
```

In this example, the message is taken as the URI-encoded query data "message=messageContentString" encoded as a name-value pair. The message content is a URI-encoded string. In this example, the parametric information (107) from which an endpoint for a target service that supports the operation can be identified is all the query data following the message content string. In this example, the query data includes both port type of "A" and the name of an operation on a target service.

In this example, identifying (108) the endpoint (110) of a target service that supports the operation is carried out by retrieving an endpoint description from a business registry such as a UDDI registry or a ebXML registry. In this example, the intermediary retrieves from a registry an endpoint of port type A described as bound by GET/HTTP at network address http://www.myTarget.com.

The method of FIG. 3 also includes creating (112) a target service request (114) for execution of the operation on the target service. In this example, the intermediary is programmed to create a target service request as an HTTP GET message by concatenating the endpoint address for the target service request with the operation name and the message parts. The resulting target service request, expressed in URI space is:

```
http://www.myTarget.com/servlets/myOp?message=messageContentString
```

The method of FIG. 3 also includes issuing (116) the target service request (114) to the target service (118). In this example, issuing the target service request includes opening a TCP/IP connection to the target service endpoint at http://www.myTarget.com/ and sending the HTTP GET message:

```
GET /servlets/myOp?message=messageContentString HTTP/1.1
```

Readers of skill in the art are wondering how the requester knows to send to the intermediary a request for an operation on the target service. The answer is that the intermediary or a developer of the intermediary identifies to the requester an endpoint of the web services intermediary as an endpoint that supports the operation on the target service. An identification of an endpoint of the intermediary as an endpoint that supports the operation on the target service can be implemented in a WSDL document that is registered in a business directory for discovery by the requester. Alternatively, such an identification can be downloaded from the intermediary to the requester—or even simply emailed to the requester, or to the requester's administrator, for installation by an administrator in the requester's web services configuration data.

Consider an example in which a target service is described by the following segment of WSDL pseudocode:

```
<definitions targetNamespace= . . . >
    <message name="GetQuoteInput"> . . . </message>
    <message name="GetQuoteOutput"> . . . </message>
    <portType name="StockquotePT"> . . . </portType>
```

-continued

```
    <binding name="SOAPBinding" . . . >
        <operation name="getQuote"> . . . </operation> . . .
    </binding>
    <service name="StockquoteService">
        <port name="SOAPPort" binding="tns:SOAPBinding">
            <soap:address location=
                "http://myTargetService/soap/servlet/getQuote"/>
        </port>
    </service>
</definitions>
```

An intermediary for that target service may identify to a requester an endpoint of the web services intermediary as an endpoint that supports the operation on the target service by replacing the location attribute of the address extension element in the target service description follows:

```
<soap:address location="http://www.myIntermediary.com/
    Channel/SOAP/proxy?portType=StockquotePT"/>
``` thereby creating a WSDL document exemplified by the following segment:

```
<definitions targetNamespace= . . . >
    <message name="GetQuoteInput"> . . . </message>
    <message name="GetQuoteOutput"> . . . </message>
    <portType name="StockquotePT"> . . . </portType>
    <binding name="SOAPBinding" . . . >
        <operation name="getQuote"> . . . </operation> . . .
    </binding>
    <service name="portTypeAgnosticProxy">
        <port name="intermediaryEndpoint"
            binding="SOAPBinding">
            <soap:address location=
                "http://www.myIntermediary.com/
                Channel/SOAP/proxy?portType=StockquotePT"/>
        </port>
    </service>
</definitions>,
``` which identifies an endpoint of a web services intermediary as an endpoint that supports the "getQuote" operation on the target service. Providing WSDL of the kind exemplified by this latter segment to a requester, through a registry, a download, email, or by other means as will occur to those of skill in the art, identifies to the requester an endpoint of the web services intermediary as an endpoint that supports the operation on the target service.

In the method of FIG. 3, identifying (108), in dependence upon the parametric information (107), the endpoint for a target service that supports the operation often may include identifying not just one endpoint for a target service, but two or more endpoints of target services that support the operation. Consider an example in which a port type agnostic proxy according to an embodiment of the present invention method receives as parametric information (107) a port type for an operation, queries a business registry with the port type as a query parameter, and thereby identifies a two or more endpoints of target services that support the operation. Such an identification of two or more endpoints may be carried out, for example, by querying a UDDI registry with the port type and receiving in response two or more WSDL documents that describe target services for the port type.

When two or more endpoints are so identified, methods for port type agnostic proxy support for web services intermediaries according to embodiments of the present invention typically include selecting one of the endpoints in accordance with selection rules. In a trivial case, a selection rule may be to select the first of the endpoints so identified and disregard the others. Selection rules may be more complex, including, for example, selection rules for load balancing. Rules for load balancing may be implemented by use of a data structure similar to that shown in Table 1.

TABLE 1

Latency Tracking

| Port Type | Endpoint URI | Send Time | Receive Time | Trip Latency (ms.) | Cumulative Latency (ms.) |
|---|---|---|---|---|---|
| A | http:/www.ibm.com/aTargetService | 12:01:01.1 | 12:01:01.2 | 100 | 100 |
| A | http:/www.ibm.com/aTargetService | 12:05:02.3 | 12:05:02.45 | 150 | 250 |
| A | http:/www.ibm.com/anotherTargetService | 01:10:01.5 | 01:10:01.57 | 70 | 70 |
| A | http:/www.ibm.com/anotherTargetService | 01:15:02.5 | 01:15:02.8 | 30 | 100 |
| — | — | — | — | — | — |
| — | — | — | — | — | — |

Each row in Table 1 represents a latency measurement for a request-response round trip in web services data communications between an intermediary and a target service. Table 1 provides columns for the port type and the endpoint URI for each round of request and response. The Send Time column records the time when a request message is issued from the intermediary to an endpoint on a target service for an operation of a port type. The Receive Time column records the time when a corresponding response message is received from the target service. Trip Latency is the difference between the Receive Time and the Send Time. Cumulative Latency is a running sum of Trip Latencies for each endpoint represented in the table. With a structure similar to Table 1, selection rules for use when more than one endpoint for a request is identified may be implemented as the following exemplary rules:

as more requests for operations in the same port type arrive in the intermediary, use each of the more than one identified endpoints once in turn, record latency data for each such usage, for subsequent requests for operations of the same port type, select from the latency table the endpoint having the lowest cumulative latency, send the request to that endpoint, and record pertinent latency data when the message is sent to the target service and when the corresponding response is received in the intermediary.

The exemplary data in Table 1 shows cumulative latency for requests recently sent for port type A to two endpoints, a first endpoint at URI http://www.ibm.com/aTargetService and a second endpoint at URI http://www.ibm.com/anotherTargetService. The first has a cumulative request latency of 250 milliseconds, and the second has a cumulative request latency of 100 milliseconds. Using the exemplary selection rules set forth above, a current request for an operation on port type A would be routed to the second endpoint, the one at URI http://www.ibm.com/anotherTargetService.

In the method of FIG. 3, creating (112) a target service request (114) for execution of the operation on the target service comprises may be carried out by composing the request in a data structure useful in a binding-neutral interface and calling the binding-neutral interface, passing the request as a call parameter. Similarly, issuing (116) the target service request (114) to the target service comprises calling one or more member methods in a binding-neutral interface.

A binding-neutral interface is one in which the use of the interface does not depend upon request or message binding. That is, the data structures and calling methods used to implement the interface and to carry out data communications through it, do not depend upon type of data encoding used in a message nor do they depend upon the data communications protocol used for a message. Developers of port type agnostic proxies for intermediaries according to embodiments of the present invention will often build their own binding-neutral interfaces. There is an open standard for a binding-neutral interface, however, known as "WSIF," the Web Service Invocation Framework. WSIF is now supported as part of the Apache Software Foundation's Web Services Project.

The use of a binding-neutral interface provides advantages for embodiments of the present invention. The SOAP-HTTP binding is so common in current art that users and developers sometimes forget that any other bindings exist. This results in development of systems that are very difficult if not impossible to use with other bindings or to adapt for use with other bindings. As web services grow, however, other bindings will become more useful and more common. Using a binding-neutral interface for the back end of embodiments of the present invention, moreover, also means that available bindings can be determined at run time, thereby providing a flexible, powerful, and more generally useful web services intermediary.

One way to implement a binding-neutral interface is to provide endpoint objects that are capable of invoking services in target services given a port type and an endpoint. One way to provide such endpoint objects is by use of an endpoint factory similar to the one illustrated in the following pseudocode segment:

```
// Endpoint Factory Class
// Defines a parameterized factory method for creating
endpoint objects
//
class EndpointFactory
{
    public static Endpoint createEndpointObject(portType,
    networkAddress)
    {
        // establish reference for new endpoint object
        Endpoint anEndpoint = null;
        if(portType == "A" && networkAddress ==
        "www.abc.com")
            anEndpoint = new Endpoint1;
        if(portType == "B" && networkAddress ==
        "www.def.com")
            anEndpoint = new Endpoint2;
```

-continued

```
        if(portType == "C" && networkAddress ==
        "www.ghi.com")
                anEndpoint = new Endpoint3;
        ...
        if(portType == "LAST" && networkAddress ==
        "www.lastSupported.com")
                anEndpoint = new Endpoint465;
        if anEndpoint == null) reportError( );
        else return anEndpoint;
    } // end createEndpointObject( )
} // end class EndpointFactory
```

The endpoint classes Endpoint1, Endpoint2, Endpoint3, and so on, are concrete classes that inherit an abstract endpoint class (or implement it as an interface) that provides member methods for creating message objects to contain message parts. Such an endpoint factor and other elements in such a binding-neutral interface may be used to carry out the steps of creating (112) a target service request (114) and issuing (116) the target service request (114) to the target service as illustrated in the following pseudocode segment:

```
// Get endpoint object from endpoint factory
Endpoint ep = endPointFactory.createEndPoint(portType,
networkAddress);
// Prepare an input message
Message input = ep.createInputMessage( );
// use message accessor function to insert contents of message
input.setPart("symbol", "IBM");
// Prepare a placeholder for a response value
Message output = ep.createOutputMessage( );
// execute the operation
ep.executeRequestResponseOperation("getQuote",
    input, output);
// return the result
return output;
```

This exemplary pseudocode segment, given a port type and a network address for an endpoint, calls an endpoint factory to create an endpoint object. The segment then creates a target service request by loading messages parts into the endpoint object, and issues the target service request to the target service by calling the member method executeRequestResponseOperation( ). The method of FIG. 3 includes receiving (120) in the intermediary a response (122) from the target service; creating (124) in the intermediary, in dependence upon the response (122) from the target service, a response (126) from the intermediary, and returning (128) the response (126) from the intermediary to the requesting client. In this exemplary pseudocode segment, the steps of receiving (120) a response (122) from the target service and creating (124) a response (126) from the intermediary are implemented by the call to executeRequestResponseOperation( ), typically a blocking call that waits for a response from the target service and makes the response available through the Message reference to 'output.'

The example pseudocode segments above illustrate the use of a binding-neutral interface with ports referred to as endpoints. WSIF interface syntax, however, uses the term "port" when referring to endpoints. By way of further explanation regarding use of binding-neutral interfaces, therefore, a further exemplary pseudocode segment is presented, more closely adhering to the WSIF standard. In this example, "port" is used to mean "endpoint," and for consistency of explanation, the name of the factory is changed to "portFactory."

```
// get a port (an endpoint) from the factory
WSIFPort port = portFactory.getPort(portType, networkAddress);
// Prepare an input message
WSIFMessage input = port.createInputMessage( );
// insert message contents
input.setPart("symbol",
    new WSIFJavaPart(String.class, symbol));
// Prepare a placeholder for a response value
WSIFMessage output = port.createOutputMessage( );
// execute the operation
port.executeRequestResponseOperation("getQuote",
    input, output, null);
// extract and return the result
return output;
```

Although this specification discusses exemplary methods of port type agnostic proxy support in web services intermediaries primarily in terms of processing a request on its way from a requester to a target service, it is useful to note that intermediaries according to embodiments of the present invention also typically are capable of processing response messages making their way back from a target service through the intermediary to the original requester. The method of FIG. 3, for example, includes receiving (120) in the intermediary a response (122) from the target service; creating (124) in the intermediary, in dependence upon the response (122) from the target service, a response (126) from the intermediary, and returning (128) the response (126) from the intermediary to the requesting client.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of port type agnostic proxy support for web services intermediaries, the method comprising:
    receiving in a web services intermediary a request for execution of a web services operation, wherein:
        the web services intermediary includes a proxy, wherein no configuration data available to the proxy describes an endpoint of the target service and the requester submits request for operations in port types completely unknown to the intermediary; and
        the request includes parametric information from which an endpoint for a target service that supports the operation is identified;
    identifying, by the web services intermediary in dependence upon the parametric data, the endpoint for a target service that supports the operation;
    creating, by the web services intermediary, a target service request for execution of the operation on the target service, further comprising:
        composing a request in a data structure useful in a binding-neutral interface; and
        calling the binding-neutral interface, passing the request as a call parameter; and
    issuing, by the web services intermediary, the target service request to the target service.

2. The method of claim 1 wherein the target service request as created and issued to the target service bears unexamined and unmodified message contents of the request received in the web services intermediary.

3. The method of claim 1 further comprising identifying to a requester an endpoint of the web services intermediary as an endpoint that supports the operation.

4. The method of claim 1 wherein the parametric information includes a port type for the operation.

5. The method of claim 1 wherein identifying, in dependence upon the parametric information, the endpoint for a target service that supports the operation further comprises:
   identifying, in dependence upon the parametric information, a multiplicity of endpoints of target services that support the operation; and
   selecting one endpoint from the multiplicity of endpoints in accordance with selection rules.

6. The method of claim 5 wherein:
   the parametric information includes a port type for the operation, and
   identifying, in dependence upon the parametric information, a multiplicity of endpoints of target services that support the operation comprises identifying from a registry, in dependence upon the port type, a multiplicity of target services for the port type.

7. The method of claim 5 wherein selecting one endpoint from the multiplicity of endpoints further comprises selecting one endpoint from the multiplicity of endpoints in accordance with selection rules for load balancing among target services.

8. The method of claim 1 wherein issuing the target service request to the target service comprises calling one or more member methods in a binding-neutral interface.

9. The method of claim 1 further comprising:
   receiving in the intermediary a response from the target service;
   creating in the intermediary, in dependence upon the response from the target service, a response from the intermediary; and
   returning the response from the intermediary to the requesting client.

* * * * *